United States Patent [19]

Akae et al.

[11] Patent Number: 4,871,936

[45] Date of Patent: Oct. 3, 1989

[54] COMMUTATOR FOR A STARTER MOTOR

[75] Inventors: Yoshifumi Akae; Takasi Yamamoto; Koji Arima; Tetsuo Yagi, all of Himeji, Japan

[73] Assignee: Mitsubishi Denki Kabushiki Kaisha, Tokyo, Japan

[21] Appl. No.: 246,841

[22] Filed: Sep. 20, 1988

[30] Foreign Application Priority Data

Nov. 5, 1987 [JP] Japan ............................... 62-279920

[51] Int. Cl.[4] ...................... H02K 13/00; H01R 39/16

[52] U.S. Cl. .................................... 310/233; 310/235; 310/236

[58] Field of Search ........................ 310/233, 235, 236

[56] References Cited

U.S. PATENT DOCUMENTS

| | | | |
|---|---|---|---|
| 1,589,094 | 6/1926 | Barringer et al. | 310/236 |
| 2,454,210 | 11/1948 | Runk et al. | 310/236 |
| 3,500,094 | 4/1967 | Gilbert | 310/236 |
| 4,454,437 | 6/1984 | Tanaka | 310/83 |
| 4,638,202 | 1/1987 | Ebner | 310/236 |

FOREIGN PATENT DOCUMENTS

| | | | |
|---|---|---|---|
| 134672 | 8/1986 | Japan . | |
| 404276 | 1/1934 | United Kingdom | 310/235 |

*Primary Examiner*—Patrick R. Salce
*Assistant Examiner*—C. LaBalle
*Attorney, Agent, or Firm*—Sughrue, Mion, Zinn, Macpeak and Seas

[57] ABSTRACT

A commutator 4 for a starter motor comprises a plurality of segments **4*a* electrically connected to armature coils 3, an insert member 4*b* fitted to an armature shaft 2, and a glass-fiber-reinforced phenol resin 4*c*** molded to integrate the segments with the insert member, wherein mica particles in a range of 5%-10% by weight are uniformly contained in the resin.

2 Claims, 1 Drawing Sheet

COMMUTATOR FOR A STARTER MOTOR

BACKGROUND OF THE INVENTION

1. Field of the Invention

The present invention relates to a commutator for a starter motor. More particularly, it relates to an improvement of a molded resinous body constituting the commutator.

2. Discussion of Background

FIG. 1 shows a typical example of an armature for a starter motor.

In FIG. 1, a reference numeral 1 designates an armature firmly connected to an armature shaft 2, a numeral 3 designates armature coils 1 and a numeral 4 designates a commutator. The commutator 4 comprises a plurality of segments 4*a* electrically connected to the armature coils 3, an insert member or bushing 4*b* fitted to the armature shaft 2 and a molded resinous body 4*c* for integrating the segments 4*a* with the insert member 4*b*.

In a conventional commutator for a starter motor, asbestos was used for the molded resinous body 4*c*. However, in reconsideration of adverse affect of the asbestos to the human body, a glass-fiber-reinforced phenol resin has been used for the asbestos.

In the conventional starter motor having the construction as mentioned above, it is used under such conditions that a large electric current flows in a short time and it rotates at a high speed unlike a common type of motor. Accordingly, the commutator used for the starter motor is subjected to a severe change of temperature in a short time, i.e. a heat shock, and a strong centrifugal force. In the commutator in which the glass-fiber-reinforced phenol resin is used for the molded resinous body 4*c*, however, it is difficult to form pores which are effective to expell gas because the molded resinous body has good wettability of glass to the base resin. Further, since the molded resinous body 4*c* lacks flexibility under stress due to the rigidity of the glass fibers, cracks are caused in the molded body 4*c* due to the thermal expansion of gas produced in a non-reacted resin in the molded resinous body 4*c* and an inner stress caused by a heat shock when a sudden change of temperature occurs.

SUMMARY OF THE INVENTION

It is an object of the present invention to provide a commutator for a starter motor which is free from occurrance of a crack in a molded resinous body of the commutator.

The foregoing and the other objects of the present invention have been attained by providing a commutator for a starter motor which comprises a plurality of segments electrically connected to armature coils, an insert member fitted to an armature shaft and a glass-fiber-reinforced phenol resin molded to integrate the segments with the insert member, characterized in that a small amount of mica particles are uniformly contained in the resin.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF A PREFERRED EMBODIMENT

Figure 1:
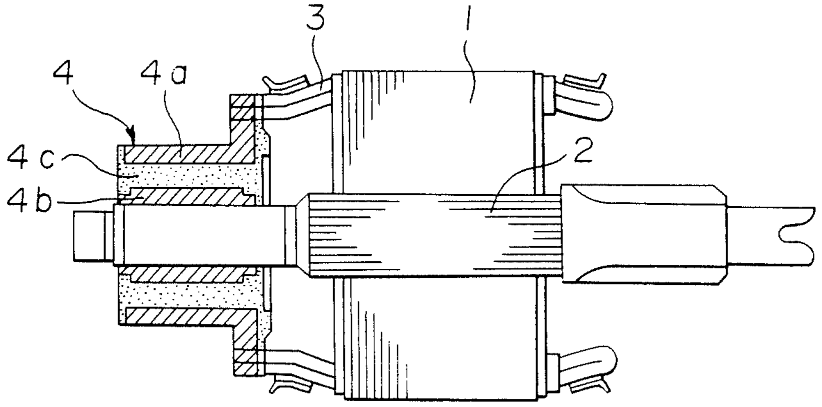
FIG. 1 is a longitudinal cross-sectional view showing a typical commutator for a starter motor, which is applicable to the starter motor of the present invention and to a conventional starter motor.

A preferred embodiment of the commutator of the present invention will be described with reference to FIG. 1. A molding resin for a molded resinous body 4*c* in the commutator includes 7% by weight of mica particles in a glass-fiber-reinforced phenol resin material as a basic component. In FIG. 1, the same reference numerals designate the same or corresponding parts, and therefore description of these parts is omitted.

In the commutator for a starter motor having such a construction, gas produced inside the molded body 4*c* is released through the laminated structure of the mica particles contained in the molded body 4*c*, whereby little gas remains inside the molded body. Further, the rigidity of mica is less than that of glass. Accordingly, even through a slight amount of gas may remain in the inside, the inner stress resulting from the thermal expansion of the gas can be absorbed. Accordingly, cracks which may result in the molded body 4*c* due to a sudden change of temperature and a strong centrifugal force can be avoided.

In the above-mentioned embodiment, the mica is mixed at 7% by weight. However, mica particles may be contained in a range from 5 wt %/10 wt % in consideration of the manufacture and strength. The above-mentioned range provides the same function and effect as the above-mentioned embodiment.

Thus, in accordance with the present invention, a small amount of mica particles is included in a glass-fiber-reinforced phenol resin material as a molding resin. Accordingly, the heat-shock resistance property can be improved and occurrence of cracks due to a sudden change of temperature can be avoided.

Obviously, numerous modifications and variations of the present invention are possible in light of the above teachings. It is therefore to be understood that within the scope of the appended claims, the invention may be practiced otherwise than as specifically described herein.

What is claimed is:

1. A commutator for a starter motor which comprises a plurality of segments electrically connected to armature coils, an insert member fitted to an armature shaft and a glass-fiber-reinforced phenol resin molded to integrate said segments with said insert member, characterized in that a small amount of mica particles are uniformly contained in and said resin in a range of 5 wt % to 10%.

2. The commutator according to claim 1, wherein said mica particles are dispersed so as to release gas produced inside said phenol resin through the laminated structure of said mica particles.

* * * * *